United States Patent [19]
Jaszczak

[11] 3,784,821
[45] Jan. 8, 1974

[54] SCINTILLATION CAMERA WITH IMPROVED RESOLUTION

[75] Inventor: Ronald J. Jaszczak, Arlington Heights, Ill.

[73] Assignee: G. D. Searle & Co., Chicago, Ill.

[22] Filed: Nov. 22, 1971

[21] Appl. No.: 200,700

[52] U.S. Cl. ............................................. 250/368
[51] Int. Cl. ............................................. G01t 1/20
[58] Field of Search ................. 250/71.5 S, 86, 105

[56] References Cited
UNITED STATES PATENTS

| | | | |
|---|---|---|---|
| 3,509,341 | 4/1970 | Hindel et al. | 250/71.5 S |
| 3,631,244 | 12/1971 | Bergstedt | 250/71.5 S |
| 3,633,031 | 1/1972 | Pesce et al. | 250/105 |

Primary Examiner—Archie R. Borchelt
Attorney—Lowell C. Bergstedt et al.

[57] ABSTRACT

An Anger-type scintillation camera system fitted with a gamma ray filter between the object under study and the detector and a signal funneling type of output signal filter, in mechanical or electrical form, associated with an image recording film. The gamma ray filter and signal funneling type of output signal filter scan in synchronism so that the total radioactivity distribution in the object is documented on the film with improved resolution.

8 Claims, 12 Drawing Figures

SCINTILLATION CAMERA WITH IMPROVED RESOLUTION

Scintillation cameras, principally Anger-type scintillation cameras (U. S. Pat. No. 3,011,057), are in widespread use in a large number of hospitals throughout the United States and foreign countries. These cameras enable physicians and researchers to visualize static and dynamic distributions of radioactivity in the human body and thereby to obtain useful diagnostic information which is often not obtainable with other equipment or is obtainable only at greater expense or greater risk to the patient. In static radioactivity imaging of human organs such as the brain, lungs, thyroid, liver, spleen, pancreas, and kidneys, the spatial resolution of the scintillation camera is an important parameter in determining the degree to which structural detail of the organ can be differentiated in the image produced by the camera. Other important parameters are efficiency (i.e. the rate of data aquisition), pulse height resolution, linearity, and uniformity of spatial and pulse height resolution and efficiency. In practice in designing a scintillation camera system, trade-offs in these parameters must usually be made so that all of them fall within certain acceptable limits, although those limits are not at present well-defined or generally agreed upon. Most of the improvements in the state-of-the-art of scintillation cameras have been directed towards improving the spatial resolution while keeping the other parameters essentially the same or in some instances also improving one or more of the other parameters.

Larsson U. S. Pat. application, Ser. No. 190,618 filed Oct. 19, 1971, discloses an approach to improving the overall spatial resolution of a scintillation camera system which employs a radiation filter means interposed between an object containing a radioactivity distribution and a radiation sensitive transducer in the detector and a signal filtering means at the output of the detector which operates in conjunction with a documentation medium, such as photographic film. The radiation filter means defines a plurality of mutually spaced passageways to the transducer for radiation quanta emitted from the object and the signal filtering means receives the output from the radiation detector and produces on the documentation medium in limited areas at positions corresponding to coordinates of intersection of the central axes of the passageways in the radiation filter means with the transducer, a visual documentation of at least a portion of the quanta of radiation interacting with the transducer. A scanning means produces synchronous relative scanning between the object and the radiation filter means and between the documentation medium and the signal filtering means so that all of the object is exposed to the transducer. The size and separation distance of the passageways in the radiation filter means and the size of the limited areas of documentation are preselected in terms of the full width at half maximum resolution value of the detector to produce a desired amount of improvement in resolution of the radiation camera system. The Larsson patent application discloses, as a signal filtering means, either an optical filter having optical passageways corresponding in geometric arrangement to the radiation filter passageways, the conception of which predates this invention, or an electronic analog to the optical filter, the conception of which postdates this invention. While the embodiments disclosed in the Larsson patent application are capable of producing a substantial improvement in spatial resolution of the camera system, a large sacrifice of sensitivity is required because the particular types of signal filtering means employed substantially reduce the number of detected events which are documented and the radiation filter means also reduces the number of radiation quanta emitted from the object which are permitted to strike the radiation sensitive transducer.

Therefore, it is the principal object of this invention, to provide an improved radioactivity imaging device of the general type disclosed in the above-referenced Larsson patent application but employing an improved signal filtering means to provide improved efficiency.

In its broadest sense this invention features a Larsson-type imaging device employing signal filtering means which comprises signal funneling means operative to produce in said limited areas a visual documentation of at least a portion of quanta of radiation interacting with the radiation sensitive transducer and producing output signals corresponding to said limited areas and of at least a portion of quanta of radiation interacting with said transducer and producing output signals corresponding to areas adjacent said limited areas.

More specifically, in an embodiment of a Larsson-type imaging device in which the output of the radiation detector comprises a pair of electrical signals, X and Y, referred to a rectangular coordinate system associated with the transducer and the radiation passageways of the radiation filter are disposed in a regular array with respect to the rectangular coordinate system, a preferred signal funneling means comprises: signal analyzing means defining an array of discrete X and Y signal amplitude channels corresponding to the regular array of radiation passageways and producing a pair of channel identification outputs identifying particular channels in which said X and Y electrical signals from said detector fall; and documentation producing means receiving said channel identification outputs for producing on said documentation medium a visual documentation substantially at one of an array of points at positions corresponding to coordinates of intersection of central axes of said passageways with said transducer.

The primary advantage of this invention is that the signal funneling means provides for the documentation of a large number of events at locations corresponding closely to the actual coordinates of interaction of an incoming radiation quanta and thus increases the efficiency of a Larsson-type radiation imaging system.

Other objects, features, and advantages of this invention will be apparent from a consideration of the following detailed description in conjunction with the accompanying drawings in which:

Figure 1:
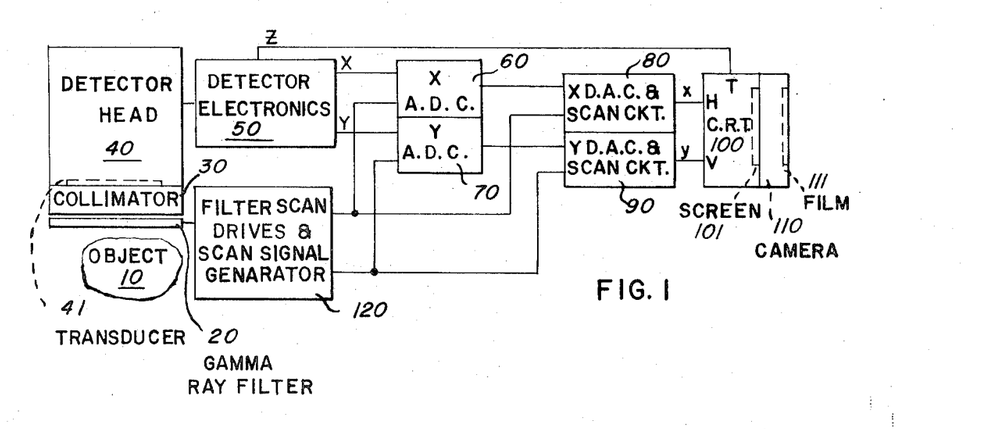
FIG. 1 is a block schematic diagram of general components of a preferred embodiment of this invention.

Referring to FIG. 1, the typical components of an Anger-type scintillation camera system are a detector head 40, a collimator 30, detector electronics 50, a cathode ray tube (CRT) 100, and recording camera 110. When operating in an analog imaging mode, an image of an object 10 which contains a distribution of gamma ray emitting radionuclides is formed on film 111 in camera 110 as an integrated collection of dots, each dot being formed by a gamma ray interacting with a radiation sensitive transducer 41 at a particular coordinate position and causing detector head 40 and detector electronics 50 to produce a set of X, Y coordinate electrical signals and a triggering signal Z — the X, Y coordinate signals being directly coupled to horizontal H and vertical V terminals of CRT 100 in the analog mode so that a flash of light is produced on CRT screen 101 at a position generally corresponding to the coordinate position of interaction of the gamma ray in the transducer. The triggering signal Z coincides with a set of X, Y coordinate electrical signals only when the energy transfer in the gamma ray-transducer interaction corresponds substantially to the energy of an unscattered gamma ray from the radionuclide distribution. As is well known, the Z signal is typically produced by a pulse height selector in detector electronics 50, and energy ratioing or compensation is typically employed in forming a set of X, Y coordinate electrical signals to make those signals essentially energy independent.

The intrinsic spatial resolution value of a camera system is a measure of the degree to which the detector head and electronics faithfully reproduce position coordinate information in response to a finely collimated beam of gamma rays interacting with a very small area of the transducer. Since the gamma ray-transducer interaction and the other signal processing in the detector head and electronics involve statistical and noise considerations, the response to a finely collimated beam of gamma rays is not a series of dots at precisely the same position, but rather a collection of dots spread in a substantially gaussian distribution around a mean value. The full width at half maximum (FWHM) of a cross section through the mean value of the distribution is a well-known measure of resolution. A typical state-of-the-art Anger-type scintillation camera such as a Pho/Gamma HP Scintillation camera has an intrinsic resolution value measured at the surface of the crystal of about 8.50 millimeters for 150 KEV gamma rays. With a collimator in front of the crystal, the overall system FWHM resolution is from about 11.5 to 16 mm depending upon the resolution of the particular collimator. This range of system resolution values are for a line source at four inches from the entrance side of the collimator.

In effect, the Larsson invention disclosed in the above-mentioned copending application provides a system in which the intrinsic resolution of the camera, i.e. detector head and electronics, is effectively bypassed because the gamma ray filter and the optical filter are designed to ensure that virtually all gamma ray-transducer interactions produced by gamma rays traversing one passageway in the gamma ray filter can only be documented on film through the corresponding passageway in the optical filter, thus limiting the spread of possible error in the documentation position of a beam of gamma rays interacting at a small area of the transducer. However, the Larsson optical filter and its corresponding electrical analog introduce inefficiencies into the system because only a small fraction of the gamma ray-transducer interactions which are registered as light flashes on the CRT (in the optical filter case) are allowed to be documented on film. It has been estimated that the implementation of the Larsson invention using an optical filter or its electrical analog as a signal filtering means results in a greater than 90% reduction in imaging efficiency and in most situations this loss of efficiency could not be tolerated.

As shown in FIG. 1 this invention also employs, as Larsson does, a gamma ray filter 20 between object 10 and transducer 41. However, FIG. 1 shows generally a signal funneling type output signal filter means which enables the documentation on film 111 of all gamma ray-transducer interactions which produce a triggering Z signal instead of just a small fraction of such interactions as in the Larsson approach. X analog-to-digital converter (A.D.C.) 60 and Y A.D.C. 70 convert each set of X, Y coordinate electrical signals from detector electronics into a pair of channel identification signals which are typically binary words. The number of bits in the words is selected to provide a number of X and Y channels at least as great as the number of X and Y passageways in gamma ray filter 20. Each A.D.C. is calibrated with gamma ray filter 20 in a particular position to provide substantially a one-to-one correspondence between A.D.C. channels and passageways in gamma ray filter 20 so that X, Y signals from gamma ray-transducer interactions produced by gamma rays traversing each particular passageway will fall substantially into one single A.D.C. channel. The X and Y A.D.C. channels then form a X, Y array of channels corresponding to the array of passageways in gamma ray filter 20. Preferably gamma ray filter 20 has a regular square array of passageways with square cross sections as shown generally in FIGS. 4 and 5 so that the X and Y A.D.C. channels can also form a square array of square channels.

The channel identification signals from X A.D.C. 60 and Y A.D.C. 70 are coupled to X D.A.C. (digital-to-analog converter) and scan circuit 80 and Y D.A.C. and scan circuit 90, respectively, which produce a pair of analog signals $x$ and $y$ representing the coordinates of the center of the particular X, Y channel location which in turn corresponds to coordinates of the intersection of the central axis of a particular passageway in radiation filter 20 with transducer 41. These analog $x$ and $y$ signals are coupled to horizontal H and vertical V terminals of C.R.T. 100 to position its beam at a location on screen 101 corresponding to coordinates of the intersection of the central axis of said passageway with the transducer. In other words, each gamma ray-transducer interaction which results in a Z signal produces a flash of light at a position on CRT screen 100 corresponding generally to the coordinates of the intersection of the central axis of the passageway in gamma ray filter 20 traversed by the gamma ray producing the interaction. As will be discussed below, there may be some small degree of tolerable "cross-talk" between a passageway and A.D.C. channels associated with adjacent passageways, but in almost all instances a gamma ray traversing a particular passageway of radiation filter 20 and interacting with transducer 41 to produce a triggering Z signal will produce a flash of light positioned at the coordinates of the central axis of that passageway.

Filter scan drives and scan signal generators 120 produce a synchronous X, Y scanning, preferably in a raster-like fashion, of gamma ray filter 20 and X and Y A.D.C.'s 60 and 70 and X and Y D.A.C. and scan circuits 80 and 90 so that all of object 10 is exposed to transducer 41 and the A.D.C. and D.A.C. circuits scan with the gamma ray filter in performing their signal funneling type of output signal filtering. Various approaches to synchronous scanning of gamma ray filter 20 and the respective A.D.C.'s and D.A.C.'s are illustrated in FIGS. 1A and 1B.

Figure 1A:
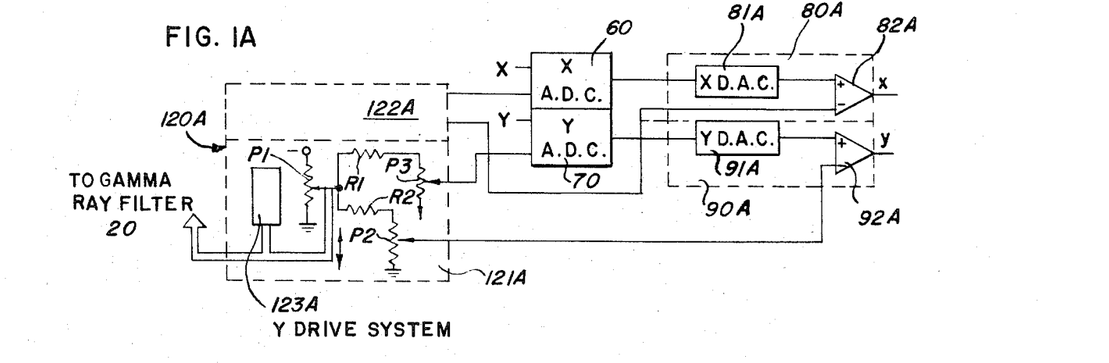
FIG. 1A is a partly block and partly circuit schematic diagram of one form of a part of the components shown in FIG. 1.

In FIG. 1A, 120A refers generally to a pair of filter scan drives and scan signal generators 121A and 122A of which only the Y filter scan drive and scan signal generator 121A is shown in detail. Y drive system 123A produces a Y direction scanning motion of gamma ray filter 20 and at the same time produces a synchronous scanning of a wiper on potentiometer P1 to vary the voltage coupled into Y A.D.C. 70 through resistor R1 and potentiometer P3 and the voltage coupled into differential amplifier 92A in Y D.A.C. and scan circuit 90A. Potentiometers P2 and P3 are used to calibrate the system for an initial Y position of gamma ray filter 20. Y A.D.C. 70 must contain a circuit to sum the coordinate signal Y from detector electronics 50 (FIG. 1) with a scan signal and also to change the resultant signal from a bipolar form to a unipolar form before conversion of the analog signal to the binary word. The dual ADC/DAC circuits available commercially from Nuclear-Chicago Corporation, Des Plaines, Illinois, have this capability. In general the Y scan signal coupled into Y A.D.C. 70, when summed with the Y coordinate signals from detector electronics 50 (FIG. 1) will maintain "registry" between the Y coordinates of the passageways in gamma ray filter 20 and the Y position of the A.D.C. channels. A corresponding Y scan signal is subtracted from the analog output of Y D.A.C. 91A to reposition that signal in accordance with the original Y coordinate signal. This scanning operation will become clearer in the discussion below of FIG. 9. The scan signal generators in the embodiment of FIG. 1A are essentially analog and facilitate scanning in either a continuous or an incremental mode.

Figure 1B:
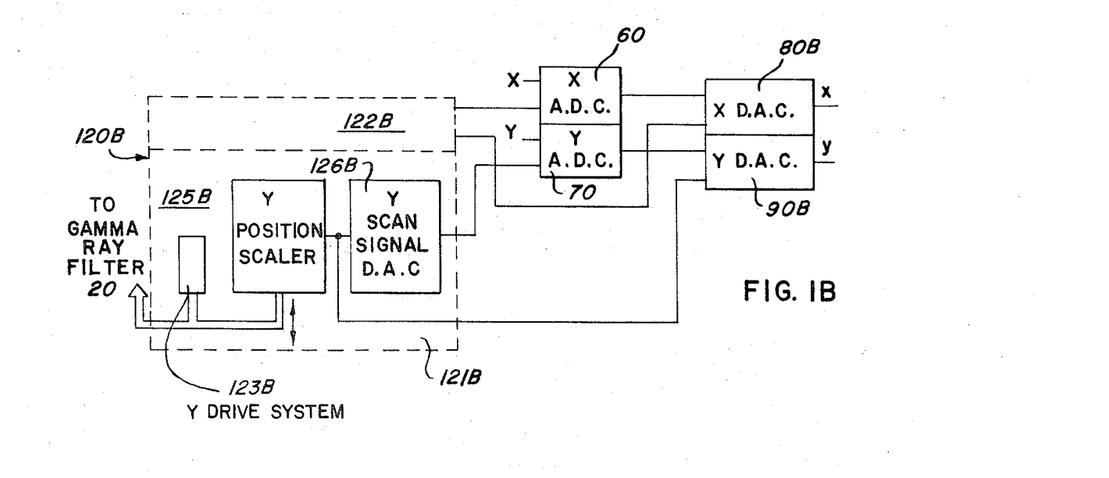
FIG. 1B is a block schematic diagram of an alternate form of a part of the components shown in FIG. 1.

In FIG. 1B, 120B refers generally to a pair of filter scan drives and scan signal generators 121B and 122B of which only the Y filter scan drive and scan signal generator 121B is shown in detail. Y drive system 123B is the same as the Y drive system 123A in FIG. 1A except that it drives a Y position scaler 125B instead of a potentiometer in synchronism with the Y direction scanning of gamma ray filter 20. Y position scaler 125B has a parallel output which is a binary word having a selected number of binary digits. In this case scanning is preferably accomplished in an incremental mode in both X and Y directions so that each possible value of the binary word output of Y position scaler 125B represents one Y position of gamma ray filter 20. A three bit scaler is capable of signalling eight separate Y coordinate positions of gamma ray filter 20. A three bit Y scan signal D.A.C. 126B changes the binary word output of Y position scaler 125B to a corresponding analog signal which is coupled to Y A.D.C. 70 where it is added to a Y coordinate signal from detector electronics 50. The parallel binary word output of Y position scaler 125B is coupled directly to Y D.A.C. 90B where it forms a portion of the binary word input — the remainder of the binary word input being obtained from Y A.D.C. 70.

Figure 1C:
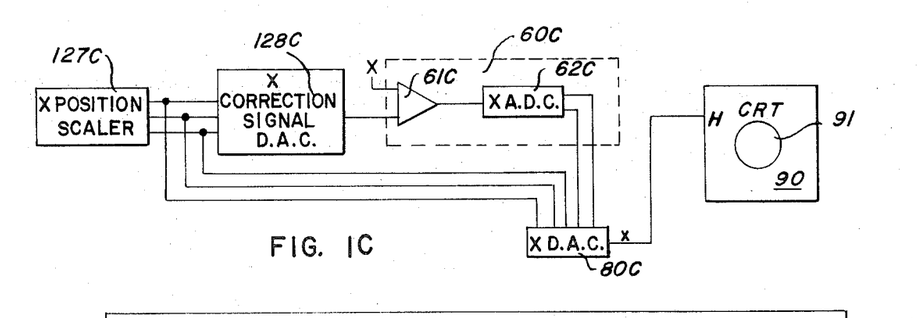
FIG. 1C is a block schematic diagram of a simplified embodiment according to FIG. 1B which is useful in explaining the operation of this invention.
Figure 4:
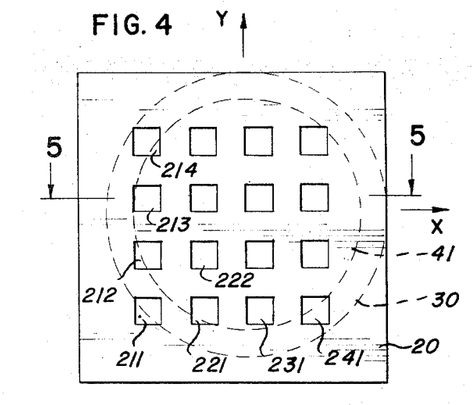
FIGS. 4 and 5 depict in simplified form components common to the embodiments shown in FIGS. 1 through 3.
Figures 5, 7:
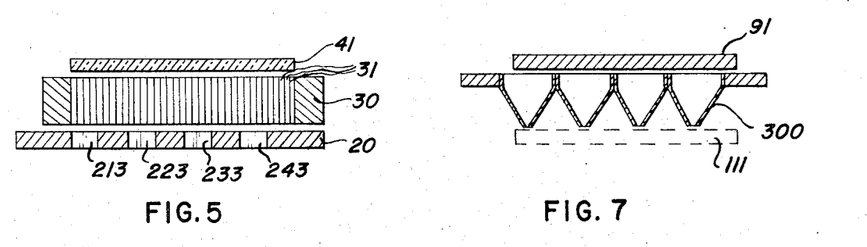
FIGS. 6 and 7 depict in simplified form components of the system shown in FIG. 3.
Figure 8:
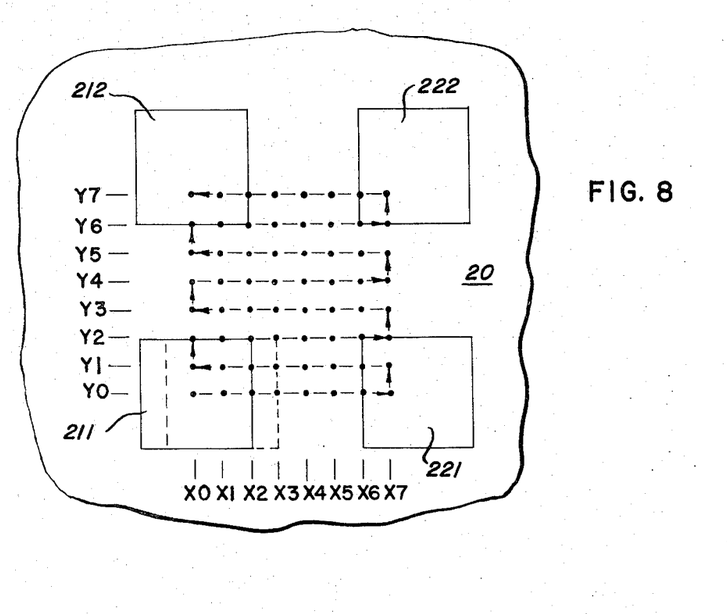
FIG. 8 depicts a scanning motion of the component shown in FIG. 4.

The operation of the system shown in FIG. 1B will be explained in terms of a simplified exemplary apparatus, relevant portions of which are shown in FIGS. 1B, 4, 5, 8, and 9. In this exemplary apparatus, as shown in FIGS. 4 and 5, a four-by-four array of passageways is provided in gamma ray filter 20. The passageways are identified by a 2 *mn* designation where *m* is the X column and *n* is the Y row, so that the lower left hand passageway is designated 211, etc. FIG. 8 shows fitler plate 20 scanning incrementally in an eight-by-eight array of positions designated by eight X positions X0 to X7 and eight Y positions Y0 to Y7. FIG. 8 shows the incremental scanning of the central axis of passageway 211 in gamma ray filter 20, and of course all of the other passageways scan in the same manner. As shown in FIG. 1C, X position scaler 127C has a three bit capacity to define the eight possible X direction scan positions of gamma ray filter 20. A corresponding Y position scaler (FIG. 1B) defines the eight possible Y direction scan positions.

Since there are four X columns of passageways in gamma ray filter 20, X A.D.C. 62C has a two bit capacity to provide four X channels in the A.D.C. matrix. The corresponding Y scan, Y A.D.C. and Y D.A.C. aspects would be identical to the X components shown in FIG. 1C. 61C in FIG. 1C refers to a summing amplifier in A.D.C. circuit 60C which receives a X-coordinate signal from detector electronics 50(FIG. 1) and a X correction or scan signal from X correction signal D.A.C. 128C which is one of eight fixed voltage levels depending upon the three bit binary word output of X position scaler 127C. X D.A.C. 80C receives, as the two most significant digits of its binary word input, the two output bits from X A.D.C. 62C and, as the three least significant digits, the three output bits from X position scaler 127C.

Figure 9:
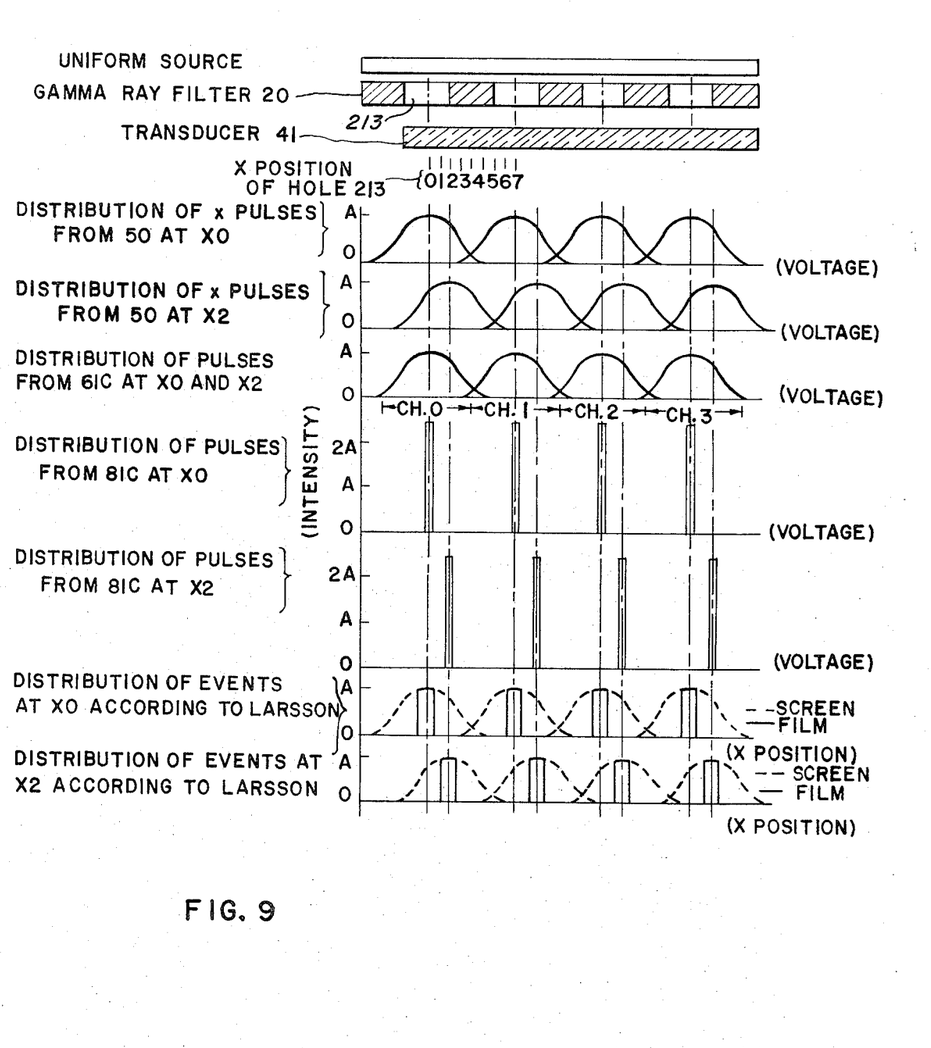
FIG. 9 is a graphical representation useful in explaining the operation of this invention.

FIG. 9 shows the operation of the apparatus of FIGS. 1C, 4 and 5 in response to a uniform source of gamma rays. This is a somewhat artificial situation, but it simplifies the explanation and understanding of the operation of this invention. The top graph shows a distribution of X coordinate pulses from detector electronics 50 when gamma ray filter 20 is at position X0. The maxima of the pulse distributions occur substantially at voltages corresponding to the X locations of the central axes of the four passage-ways in gamma ray filter 20 at position X0. The first from the top graph shows a distribution of X coordinate pulses from detector electronics 50 when gamma ray filter 20 is at position X2. Again the maxima of the pulse distributions occur substantially at voltages corresponding to the X locations of the central axes of the four passageways in gamma ray filter 20 at position X2. However, as the second from the top graph shows, the distribution of the pulses from summing amplifier 61C is the same at positions X0 and X2. The reason for this is that the X correction signal D.A.C. 128C has produced a negative voltage which is added to the X pulse distribution at position X2. Thus the pulse distributions continually fall into the four A.D.C. channels shown as CH.0 through CH.3. However, the distribution of pulses from 80C at X0 and X2 are shifted with respect to each other because X position scaler 127C has changed from a 000 binary word value to a 010 binary word value. This change in binary word value produced the subtraction of an analog voltage value from the X coordinate pulse distribution from 50 at position X2 and an addition to the voltage at the output of X D.A.C. by a corresponding amount.

From the simplified example illustrated in FIG. 9 it is apparent that all of the events occurring within a particular A.D.C. channel result in an output signal at substantially the center of that channel which corresponds with the central axis of a corresponding passageway in gamma ray filter 20. Thus each of the events which result from a gamma ra interaction which satisfies pulse height selection requirements is imaged at one of an array of points determined by the X and Y A.D.C. channels into which the event falls. As shown in FIG. 9, this is in contrast to the Larsson approach in which a large number of events are eliminated from the final image because of the operation of the optical filter or its electrical analog. From this comparison it can readily be appreciated that the output signal funneling type of output signal filter which characterizes this invention produces a dramatic improvement in the efficiency of the general Larsson-type gamma ray filter-output signal filter apparatus.

From the above simplified explanation of a four-by-four array of gamma ray filter passageways and corresponding four-by-four array of X and Y A.D.C. channels, it should be apparent how the apparatus would be extended to a practical system involving up to a 32 × 32 array of passageways and X and Y A.D.C. channels by employing five bit A.D.C.'s. Commercially available A.D.C.'s may have as much as an eight bit capacity, in which case the five most significant bits only are used. An eight-by-eight scanning array is useful in practice, so the input to the X and Y D.A.C.'s would be a total of eight bits.

In two actual embodiments of this invention the following results were obtained:

Example 1. Using a medium resolution 150 KEV collimator (9.5 mm (FWHM) at 4 inches) and a gamma ray filter having 0.281 inch square holes on 0.485 inch centers, the overall system resolution was about 6 mm (FWHM) at the face of the gamma ray filter and about 9.5 mm (FWHM) at 4 inches and the overall system efficiency was about 38 percent of the efficiency of the system without the gamma ray filter. The resolution of the overall system, i.e. the detector and collimator together without the gamma ray filter, was about 13 mm (FWHM).

Example 2. Using a high resolution 150 KEV collimator (8.0 mm (FWHM) at 4 inches) and a gamma ray filter having 0.316 inch square holes on 0.500 inch centers, the overall system resolution was about 7 mm (FWHM) at the face of the gamma ray filter and about 8.5 mm (FWHM) at 4 inches and the overall system efficiency was about 49 percent of the efficiency of the system without the gamma ray filter and 33 percent of the system efficiency with the medium resolution collimator of Example 1 above. In this example, the system resolution without the gamma ray filter was about 12 mm (FWHM).

From these examples it can be readily seen that dramatic improvements in spatial resolution of the overall system with moderate sacrifices in sensitivity are achieved by the use of this invention.

In an actual embodiment of this invention, filter scan drives using hydraulic or motor driven gear arrangements may be employed. It has been discovered that it is preferable to position gamma ray filter 20 between collimator 30 and the object 10 (as shown in FIGS. 1 and 5) rather than between collimator 30 and transducer 41 because greater resolution improvement is achieved. Collimator 30 and gamma ray filter 20 can be combined into one unit. Of course, it will be readily appreciated that this invention can be adapted in an obvious way to any type of presently employed collimator — pinhole, diverging, converging, etc. The invention can also be employed in camera systems other than Anger-type cameras.

Figures 2, 3:
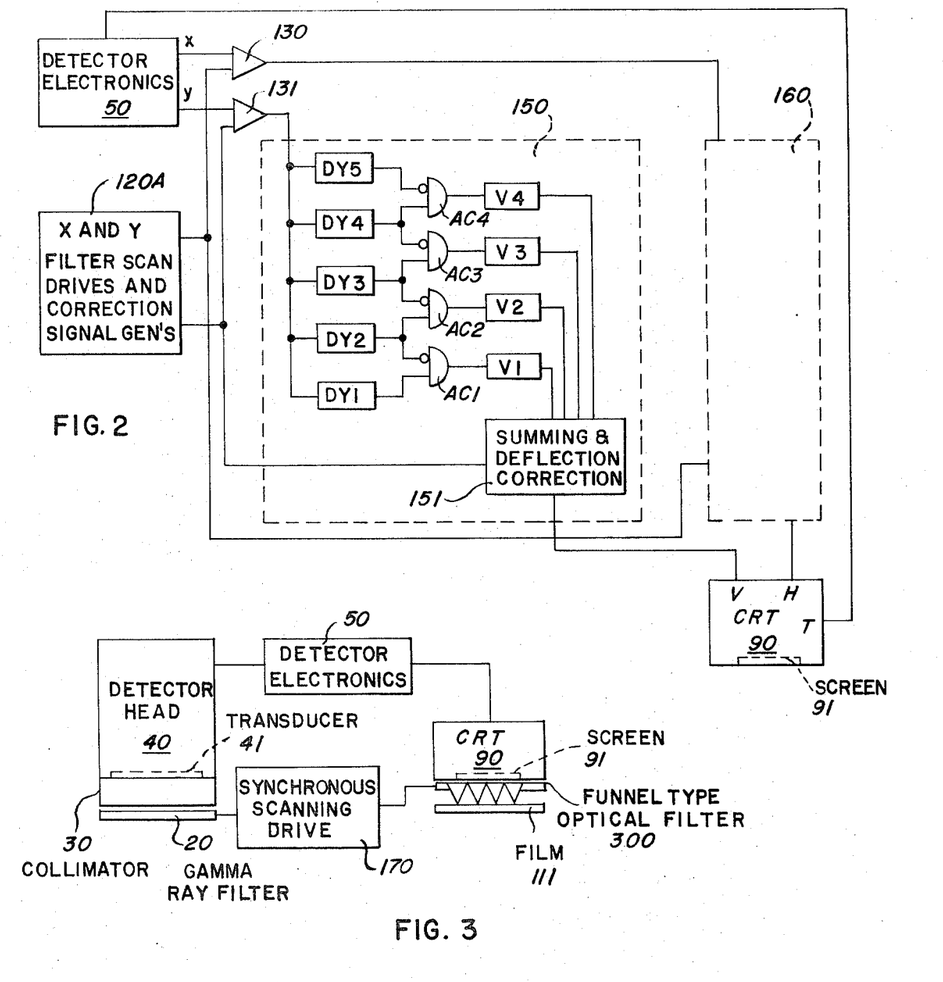
FIG. 2 is a block schematic diagram of an alternate embodiment in accordance with this invention.
FIG. 3 is a block schematic diagram of another alternate embodiment in accordance with this invention.
Figure 6:
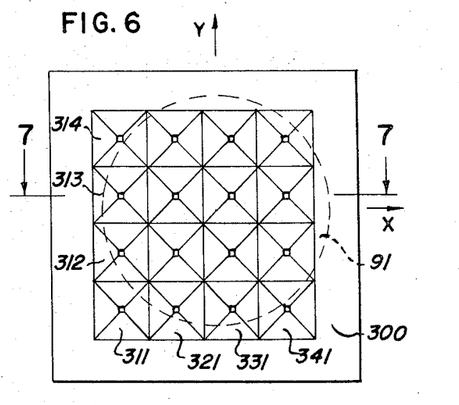

The systems shown in FIG. 2 and in FIGS. 3, 6, and 7 while not specifically a part of this invention, illustrate the breadth of the general concept of employing a signal funneling type of output signal filter in a Larsson-type system, which concept is at the heart of this invention. FIG. 2 shows a system in which a series of discriminator circuits DY1 through DY5 together with anticoincidence gates AC1 through AC4 and voltage generators V1 through V4 constitute a "signal funneling means" which is equivalent to the A.D.C.-D.A.C. "signal funneling means" in FIGS. 1, 1A, 1B, and 1C. In FIG. 2 discriminator circuits DY 1 through DY5 and anticoincidence gates AC1 through AC4 define an array of four Y signal amplitude channels corresponding to four Y rows of passageways in gamma ray filter 20. Similar circuitry in box 160 for the X channel is provided. Voltage generators V1 through V4 each produce, when triggered, a voltage representative of a center of a corresponding signal amplitude channel, so the result of the operation of the system of FIG. 2 is functionally equivalent to the system shown in FIG. 1.

FIG. 3 illustrates, together with FIGS. 6 and 7, a system in which an output signal funneling type of output signal filter comprises a funnel type optical filter 300 scanning between CRT screen 91 and film 111 in synchronism with gamma ray filter 20. This system accomplishes an equivalent result to the systems in FIGS. 1 and 2 by funneling flashes of light on screen 91 to an array of small areas positioned at locations corresponding to central axes of passageways in gamma ray filter 20.

It should be apparent that this invention is not limited to the exemplary apparatus illustrated in the drawings and described above and that numerous modifications could be made without departing from the scope of this invention as claimed in the following claims.

I claim:

1. Apparatus for imaging an object containing a radioactivity distribution comprising:
    a radiation detector, including a radiation sensitive transducer, of the type producing an output representing coordinates of interaction of quanta of radiation with said transducer, said detector having a predetermined resolution value expressed in terms of full width at half maximum;
    radiation filter means interposed between said transducer and said object for defining a plurality of mutually spaced radiation passageways to said transducer for radiation quanta emitted from said object;

a documentation medium;

signal filtering means receiving said output of said radiation detector operative to produce on said documentation medium, in limited areas at positions corresponding to coordinates of intersection of central axes of said passageways with said transducer, a visual documentation of at least a portion of said quanta of radiation interacting with said transducer, said signal filtering means comprising signal funneling means operative to produce in said limited areas a visual documentation of at least a portion of quanta of radiation interacting with said transducer and producing output signals corresponding to said limited areas and of at least a portion of quanta of radiation interacting with said transducer and producing output signals corresponding to areas adjacent said limited areas; and scanning means for producing relative scanning between said object and said radiation filter means and a corresponding synchronous relative scanning between said documentation medium and said signal filtering means such that all of said object is exposed to said transducer through said radiation passageways;

the size and separation distance of said radiation passageways and the size of said limited areas of documentation being preselected in terms of said full width at half maximum resolution value of said detector to produce a desired value of resolution of the overall apparatus.

2. Apparatus as claimed in claim 1, wherein said output of said radiation detector comprises a pair of electrical signals, X and Y, referred to a rectangular coordinate system associated with said transducer; said radiation passageways of said radiation filter are disposed in a regular array with respect to said rectangular coordinate system; and said signal funneling means comprises:

signal analyzing means defining an array of discrete X and Y signal amplitude channels corresponding to said regular array of radiation passageways and producing a pair of channel identification outputs identifying particular channels in which said X and Y electrical signals from said detector fall; and documentation producing means receiving said channel identification outputs for producing on said documentation medium a visual documentation substantially at one of an array of points, at positions corresponding to coordinates of intersection of central axes of passageways with said transducer.

3. Apparatus as claimed in claim 2, wherein said signal analyzing means comprises X analog-to-digital converter and a Y analog-to-digital converter; and said documentation producing means comprises a cathode ray tube having horizontal and vertical deflection circuits, a X digital-to-analog converter coupled between said X analog-to-digital converter and said horizontal deflection circuit, and a Y digital-to-analog converter coupled between said Y analog-to-digital converter and said vertical deflection circuit.

4. Apparatus for imaging an object containing a radioactivity distribution comprising:

a radiation detector, including a radiation sensitive transducer with respect to which a X-Y coordinate system has been assigned;

a radiation filter interposed between said transducer and said object comprising an array of radiation passageways having rows and columns thereof parallel to the X and Y axes of said coordinate system;

said radiation detector being of the type which produces a pair of analog detector output signals, X and Y, representing position coordinates at which a quantum of radiation traversing a particular one of said passageways interacts with said transducer;

X and Y analog-to-digital converters for converting said X and Y signals from said detector into a pair of binary digital words representing coordinates of the central axis of said particular one of said radiation passageways;

X and Y digital-to-analog converters for converting said pair of binary digital words into a pair of analog DAC output signals representing coordinates of said central axis of said particular one of said radiation passageways;

a display device for producing a display of said pair of analog electrical signals from said X and Y digital-to-analog converters;

a documenting device for documenting said display; and scanning means for producing synchronous relative scanning between said object and said radiation filter and between said digital-to-analog converters and said documenting device whereby a high resolution image of said object is produced in said documenting device.

5. Apparatus as claimed in claim 4, wherein said display device comprises a cathode ray tube for producing a small spot of light positioned in accordance with an input pair of analog electrical signals; said documenting device comprises a camera viewing said cathode ray tube to record each spot of light on photographic film; said radiation filter is movably mounted on said radiation detector; and said scanning means comprises:

a pair of filter scan drives and scan signal generators for producing a raster scan movement of said radiation filter and a pair of analog scan signals representing the position coordinates of said radiation filter;

circuit means for adding said analog scan signals to said analog detector output signals at the input of said X and Y analog-to-digital converters; and circuit means for subtracting said scan signals from said pair of analog DAC output signals at the input of said cathode ray tube.

6. Apparatus as claimed in claim 4, wherein said display device comprises a cathode ray tube for producing a small spot of light positioned in accordance with an input pair of analog electrical signals; said documenting device comprises a camera viewing said cathode ray tube to record each spot of light on photographic film; said radiation filter is movably mounted on said radiation detector; and said scanning means comprises:

X and Y drive systems for producing a digitally incrementing raster scan movement of said radiation filter;

X and Y position scalers for producing binary digital scan signals representing position coordinates of said radiation filter;

X and Y scan signal digital-to-analog converters for converting said binary digital scan signals to analog scan signals;

circuit means for adding said analog scan signals to said analog detector output signals at the input of said X and Y analog to digital converters; and circuit means for adding said binary digital scan signals to said pair of binary digital words at the input of said X and Y digital-to-analog converters.

7. Apparatus for imaging an object containing a radioactivity distribution comprising:

an Anger-type radiation detector, including a scintillator;

a radiation collimator mounted on said detector;

a radiation filter interposed between said collimator and said object comprising a regular array of separated radiation passageways;

said detector producing an output signal representing the position at which a quantum of radiation traversing a particular one of said radiation passageways interacts with said scintillator;

a documentation medium;

signal funneling means for funneling said output signal from said detector tto a documentation location on said documentation medium at a position corresponding to the central axis of said particular one of said radiation passageways; and scanning means for producing synchronous relative scanning between said radiation filter and said object and between said documentation medium and said signal funneling means.

8. Apparatus for imaging an object containing a radioactivity distribution comprising:

a radiation detector, including a radiation sensitive transducer;

a radiation filter interposed between said object and said transducer comprising a regular array of separated radiation passageways;

said detector producing a pair of output electrical signals representing the position at which a quantum of radiation traversing a particular one of said radiation passageways interacts with said transducer;

electrical signal filtering means for converting said pair of output electrical signals to a pair of filtered electrical signals representing the position of the central axis of said particular one of said radiation passageways;

documentation means for documenting said pair of filtered electrical signals; and scanning means for producing synchronous relative scanning between said radiation filter and said object and between said electrical signal filtering means and said documentation means.

* * * * *